US008657485B2

(12) United States Patent
Neier et al.

(10) Patent No.: US 8,657,485 B2
(45) Date of Patent: Feb. 25, 2014

(54) AGRICULTURAL MIXER WITH HYDRAULIC DRIVE SYSTEM INCLUDING JAM DETECTION AND RESOLUTION FEATURES AND METHOD OF USING SAME

(75) Inventors: Rodney R. Neier, Dodge City, KS (US); Allin L. Butcher, Dodge City, KS (US); James E. Shafer, Dodge City, KS (US); Ross M. Groening, Dodge City, KS (US)

(73) Assignee: Roto-Mix, LLC, Dodge City, KS (US)

( * ) Notice: Subject to any disclaimer, the term of this patent is extended or adjusted under 35 U.S.C. 154(b) by 87 days.

(21) Appl. No.: 12/834,500

(22) Filed: Jul. 12, 2010

(65) Prior Publication Data
US 2012/0008457 A1 Jan. 12, 2012

(51) Int. Cl.
*B01F 7/24* (2006.01)
(52) U.S. Cl.
USPC ............................ 366/297; 366/314; 366/603
(58) Field of Classification Search
USPC ......... 366/302, 306, 307, 314, 318–324, 603, 366/297–300; 241/101.76, 101.761, 101.8, 241/260.1, 605
See application file for complete search history.

(56) References Cited

U.S. PATENT DOCUMENTS

| 4,153,376 | A |   | 5/1979  | Neier            |         |
|-----------|---|---|---------|------------------|---------|
| 4,285,598 | A |   | 8/1981  | Horton           |         |
| 4,444,509 | A |   | 4/1984  | Steiner et al.   |         |
| 4,765,747 | A |   | 8/1988  | High, Jr. et al. |         |
| 5,462,354 | A | * | 10/1995 | Neier            | 366/314 |
| 6,575,615 | B2|   | 6/2003  | Rowe et al.      |         |
| 6,651,416 | B2|   | 11/2003 | Trelstad et al.  |         |
| 6,758,426 | B2| * | 7/2004  | Have             | 241/30  |
| 7,341,372 | B2| * | 3/2008  | Van Der Plas     | 366/141 |
| 7,347,614 | B2| * | 3/2008  | Cicci et al.     | 366/297 |
| 7,484,437 | B2| * | 2/2009  | Brunazzi et al.  | 74/810.1|
| 2002/0033142 | A1 |  | 3/2002 | Martin et al.   |         |
| 2005/0172741 | A1 | * | 8/2005 | Van Der Plas    | 74/336 R|
| 2006/0050604 | A1 | * | 3/2006 | Brunazzi et al. | 366/20  |
| 2006/0126430 | A1 | * | 6/2006 | Cicci et al.    | 366/314 |
| 2006/0256647 | A1 | * | 11/2006| Van Der Plas    | 366/141 |
| 2009/0238032 | A1 | * | 9/2009 | McFarlane et al.| 366/270 |
| 2012/0008457 | A1 | * | 1/2012 | Neier et al.    | 366/190 |

FOREIGN PATENT DOCUMENTS

EP 1529563 A1 * 5/2005 ............... B01F 7/24

OTHER PUBLICATIONS

Roto-Mix, LLC et al., PCT/US2011/043708, "Notification of Transmittal of the International Search Report and the Written Opinion of the International Searching Authority" dated Mar. 14, 2012, 9 pages.

* cited by examiner

*Primary Examiner* — Charles E Cooley
(74) *Attorney, Agent, or Firm* — McKee, Voorhees & Sease, P.L.C.

(57) ABSTRACT

An agricultural mixer includes a hydraulic drive system. The mixer includes an automatic jam-resolving feature, whereby if an auger becomes jammed, the drive system will cause the auger to rotate in a reverse direction for a period of time to resolve the jam. The hydraulic drive system will maintain a speed of rotation of the auger at a relatively constant rate during mixing while choosing an efficient displacement setting for the hydraulic motor. The auger is maintained at a constant speed during a discharge mode by maintaining the motor in a maximum displacement setting. A clean-out mode is provided wherein the auger is rotated at a maximum speed to aid in cleaning out the last remaining feed mixture in the mixer.

22 Claims, 4 Drawing Sheets

AGRICULTURAL MIXER WITH HYDRAULIC DRIVE SYSTEM INCLUDING JAM DETECTION AND RESOLUTION FEATURES AND METHOD OF USING SAME

FIELD OF THE INVENTION

The present invention relates generally to agricultural mixers of the type that utilize an auger or augers within a mixing tub. More particularly the invention relates to structures and methods for controlling rotation of the auger or augers.

BACKGROUND OF THE INVENTION

Various types of agricultural feed mixers are known. One type of mixer, known as a vertical axis mixer, utilizes a mixing tub having an open upper end and including at least one rotatable auger mounted about a vertical axis within the tub. The rotation of the auger causes feed within the tub to be agitated, chopped, and mixed.

Many of these mixers are mounted upon trailers that can be drawn behind a conventional agricultural tractor. They include drive systems that can be powered by the power take off of the tractor. Other types of mixers are mounted directly on a self-propelled vehicle and are driven by the internal combustion engine that also propels the vehicle. Alternatively, such mixers may be mounted in a stationary position and be provided with their own power source, or include a connection for a power take off.

One of the issues faced by such mixers is providing appropriate rotational force to the auger or augers. The amount of force required to rotate the augers can vary depending upon a number of factors, including the amount of feed in the tub, the stage of the mixing process, whether the augers are already rotating, and the type and condition of the feed. The difficulties in maintaining an appropriate input force to the augers can be exacerbated by variations in the amount of available power provided by the power take off from an agricultural vehicle, and by changing conditions within the material being mixed.

It is typically desirable to maintain a generally constant rate at which feed is discharged from the tub wherein the mixer is discharging the feed. This can be difficult to maintain as the amount of resistance provided by the feed against the augers decreases as the amount of feed in the tub decreases.

Another difficulty associated with this type of agricultural feed mixer is that it can be difficult to completely discharge and clean out all of the feed from the tub as some of the feed may tend to cling to the augers and remain within the tub.

Yet another difficulty faced in operating these vertical auger mixers is that one or more of the augers can stall or jam due to feed wedging between the walls on especially the floor of the tub and the augers. Furthermore, the augers can become stalled due to the feed being packed tightly around the augers during transportation.

SUMMARY OF THE INVENTION

It is an object of the present invention to provide an agricultural mixer of the type that utilizes a vertical auger or augers in a tub that overcomes one or more of the above-identified difficulties.

According to one embodiment, the present invention is directed to an agricultural mixer with at least one vertical auger wherein a hydraulic drive system automatically adjusts the auger speed to allow full usage of available power input.

According to another embodiment, the present invention is directed to an agricultural mixer with at least one vertical auger that maintains a generally constant auger speed while discharging feed regardless of power take off input speed variations and variations in resistance against the auger.

According to another embodiment, the present invention is directed to an agricultural feed mixer with at least one vertical auger that includes a clean out mode whereby the auger is caused to rotate significantly faster than during mixing and feeding modes.

According to another embodiment, the present invention is directed to an agricultural feed mixer with at least one vertical auger that includes a jam resolving mode whereby the auger is rotated in a reverse direction and then rotated in a forward rotation to resolve a stalled condition of the auger.

According to one embodiment, the present invention is directed to an agricultural feed mixer that includes a tub and an auger extending into the tub. The auger is rotatable about a vertical axis. A hydraulic drive is operably connected to the auger to rotate the auger about the axis. A jam detection mechanism detects when the auger is jammed such that the auger will not rotate freely in a first direction around the axis. A controller causes the hydraulic drive to rotate the auger in a reverse direction around the axis when the jam detector detects that the auger is jammed.

According to another embodiment, the present invention is an agricultural mixer that has an auger extending into a tub, the auger being rotatable in a first direction about a vertical axis to mix material within the tub. A hydraulic motor is operably connected to the auger to rotate the auger about the vertical axis. A hydraulic pump is operably connected to the hydraulic motor to supply pressurized hydraulic fluid to the hydraulic motor. A controller controls the pump and motor. A pressure sensor senses a pressure of the hydraulic fluid and provides a pressure signal to the controller. A rotation sensor senses a rotation speed of the auger and provides a rotation speed signal to the controller. The controller has a jam resolving mode such that when the controller receives a pressure signal above a maximum threshold and a rotation speed signal indicating that the auger is not rotating, the controller causes the auger to rotate in a reverse direction opposite from the first direction for a period of time.

According to another embodiment the present invention is a method of operating an agricultural feed mixer of the type having a generally vertical auger in a tub. The method includes the steps of: detecting that the auger is jammed such that it is not rotating in a forward mixing direction; rotating the auger in a reverse direction after detecting that it is jammed; and rotating the auger in the forward mixing direction after rotating it in the reverse direction.

According to yet another embodiment, the present invention is a method of efficiently operating an agricultural feed mixer of the type having a generally vertical auger in a tub wherein the vertical auger is operably attached to a variable displacement hydraulic motor having a maximum displacement setting and a minimum displacement setting such that the variable displacement auger will rotate the vertical auger within the tub. The auger is rotated in a forward mixing direction using the hydraulic motor at the maximum displacement. A pressure is periodically sensed of hydraulic fluid in communication with the hydraulic motor while the auger is rotating with the hydraulic motor at the maximum displacement setting. The hydraulic motor is shifted to the minimum displacement setting if the sensed pressure of the hydraulic fluid is below a minimum pressure for a first predetermined period of time. the pressure of hydraulic fluid in communication with the hydraulic motor is periodically sensed while the auger is rotating with the hydraulic motor at the minimum displacement setting. The hydraulic motor is shifted back to the maximum displacement setting if the sensed pressure of the hydraulic fluid is above a maximum pressure for a second predetermined period of time.

DETAILED DESCRIPTION OF THE PREFERRED EMBODIMENTS

Figure 1:
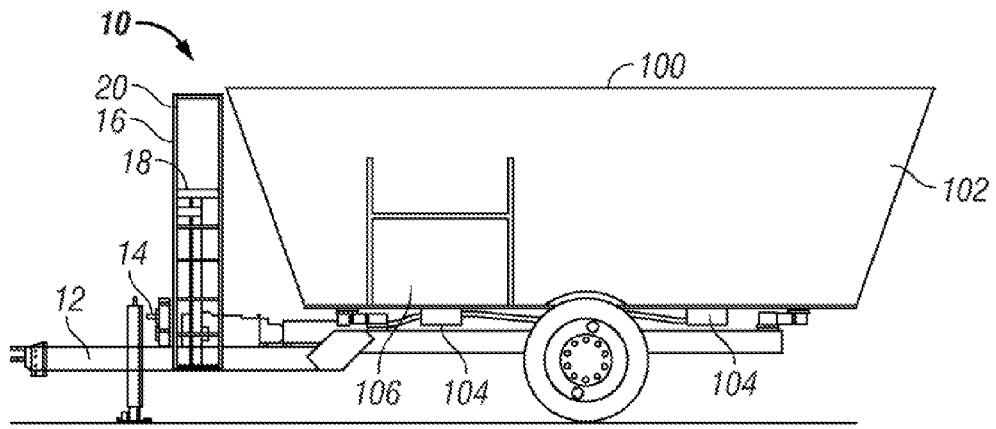
FIG. 1 is a side view of a mixer according to one embodiment of the present invention mounted on a trailer.

FIG. 1 shows a trailer 10 that includes mixer 100 according to one embodiment of the present invention. The trailer 10 includes a hitching tongue 12 for attachment to a towing vehicle (not shown) such as a tractor. A power take off connection 14 is provided to attach to the towing vehicle's power take off in order to provide power to the mixer 100. A ladder 16 is provided near a front end of the mixer 100. Mixer 100 includes a tub 102 that opens upwardly and provides a vessel for containing and mixing livestock feed, or other materials. The mixer 100 includes at least one vertical auger (not shown) for rotation about a vertical axis to mix material added to the tub 100 into a desired mixture. Hydraulic motors 104 transmit power to the augers. A unique hydraulic drive system for operating the hydraulic motors 104 is described and shown in more detail below. A gate 106 is provided at a lower portion of the tub 102 to permit off loading of the mixture. The gate 106 may be selectively raised or lowered by a user. As an alternative to the gate 106 provided on the side of the tub 102 as shown in FIG. 1, a front or rear gate may be provided. Conveyors or the like may be utilized in association with the gate to help in off loading and distributing the mixture. The ladder 16 includes an upper platform 18 and railing 20. The ladder 16 and platform 18 permit a user to view over the top edge of the tub 102 into the interior of the tub 102. The ladder 16 may also be useful in loading materials into the tub 102 for mixing.

Figure 2:
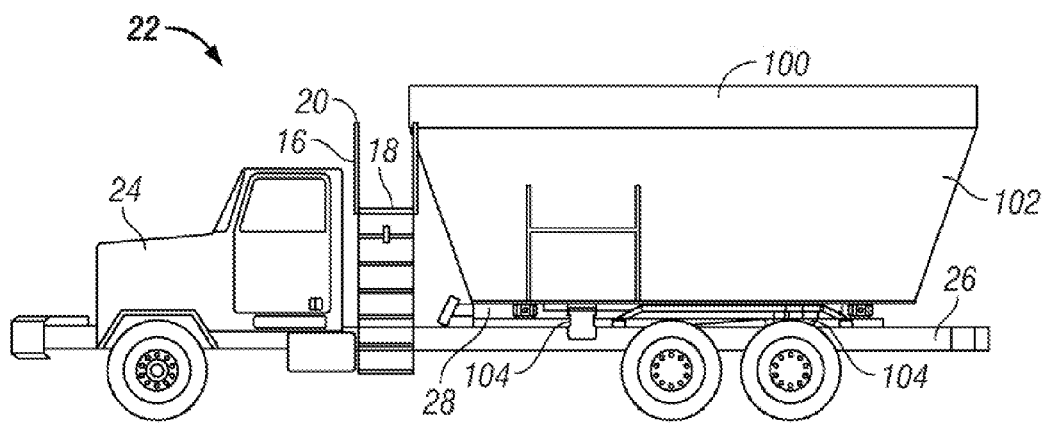
FIG. 2 is a side view of a mixer according to one embodiment of the present invention mounted on a self-propelled truck.

FIG. 2 shows an embodiment of a truck 22 that includes a mixer 100 according to one embodiment of the present invention. The truck 22 has a cab 24 and a frame 26. The tub 102 of the mixer 100 is mounted on the truck frame 26. A drive line 28 provides power from an engine (not shown) within the truck cab 24 to provide power to the pumps (not shown) that ultimately provide pressurized hydraulic fluid to the hydraulic motors 104. The hydraulic motors 104 transmit rotational power to the augers (not shown in FIG. 2) within the mixer 100. It should be appreciated that certain features and advantages of the present invention may be used in association with other types of motors and transmissions, in addition to hydraulic motors, including for example variable shifting devices.

Figure 3:
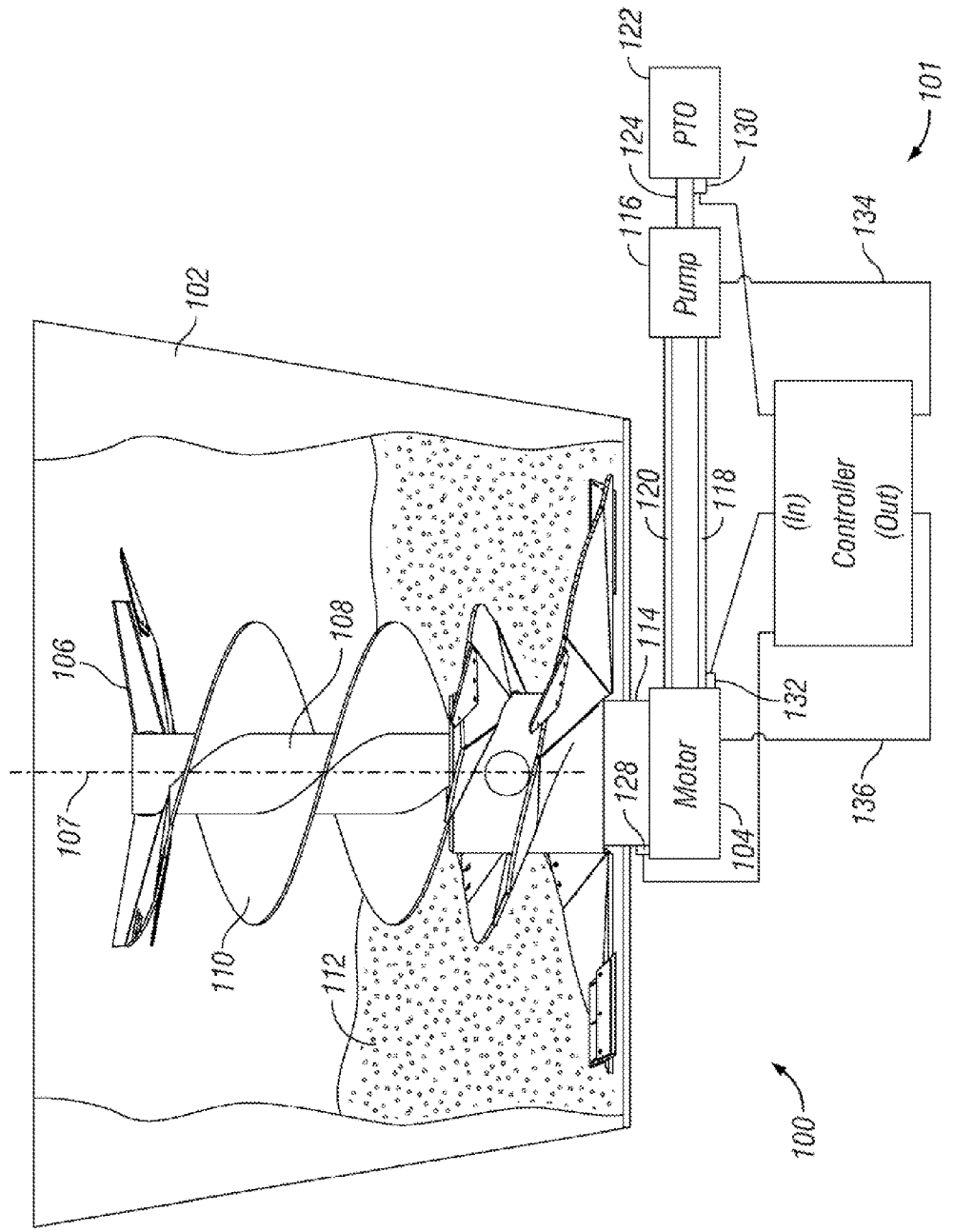
FIG. 3 is a schematic representation of a hydraulic drive system attached to a single auger mixer according to one embodiment of the present invention.

FIG. 3 is a schematic representation of a mixer 100 according to one embodiment of the present invention. According to the embodiment of FIG. 3, the mixer 100 includes a single vertical auger 106 that rotates about a generally vertical axis 107. The auger 106 extends into tub 102 in order to mix and ultimately dispense a mixture 112 provided within tub 102. The mixture 112 may include ingredients such as hay, grain, silage, feed additives, molasses, animal fat, and other ingredients may be added into the tub 102 through the open top end. The auger 106 can then be rotated to mix the ingredients. The auger 106 includes a shaft 108 from which auger flights 110 extend generally radially outwardly. Rotation of the shaft 106 causes the auger flights 110 to move through the mixture 112 in order to chop and blend the mixture 112. As used herein, the term auger is meant to refer to any structure that can be rotated about a vertical axis within a tub in order to chop and/or blend a feed mixture. The auger 106 is mounted to a hydraulic drive system 101 that controls the rotational force applied to the auger 106.

The hydraulic drive system 101 includes a hydraulic motor 104 that has an output shaft 114 that engages the auger 106 to provide rotational force to cause the auger 106 to rotate about axis 107. According to one embodiment, the hydraulic motor 104 is a variable displacement motor that includes at least two speeds, a high speed when the motor is adjusted to a minimum displacement, and a low speed when the motor is adjusted to a maximum displacement setting. According to one embodiment, the hydraulic motor 104 may be a two-speed hydraulic motor sold under the brand and model designation Poclain MS50. Pressurized hydraulic fluid is provided to the motor 104 by pump 116. According to one embodiment, the pump 116 is a variable output two direction pump. According to one embodiment, the variable output two direction pump is a pump sold under the brand and model designation Linde HPV 75CC. The pump 116 provides pressurized hydraulic fluid to the motor 104 through hydraulic lines 118 and 120. When the motor 104 is operated to drive the auger 106 in a forward direction that chops and mixes the mixture 102, line 118 acts as a supply line, and line 120 acts as a return line for the hydraulic fluid to the pump 116. When the motor 104 is operated to drive the auger 106 in a reverse direction, line 120 acts as a supply line, and line 118 acts as a return line for the hydraulic fluid to the pump 116. While omitted from the drawings for ease of understanding, those of skill in the art will appreciate that additional components such as pressure relief valves, temperature sensors, cooling fans, and the like should be include in the hydraulic system.

The pump 116 is driven by a power supply 122 that rotates an output shaft 124 engaged by the pump 116. The output shaft 124 may be a power take off from a tractor, in the case where the mixer 100 is mounted on a trailer 10 as shown in FIG. 1. Alternatively, the output shaft 124 may be an output shaft from a self-propelled vehicle, such as the truck 22 of FIG. 2. An electronic controller 126 is provided as part of the hydraulic drive system 101 in order to automatically control the components of the mixer 100. According to one embodiment, the controller 126 is a programmable 30-pin digital controller. According to one embodiment, the controller 126 maybe programmed to act as a partial integral derivative (PID) controller. In the embodiment shown in FIG. 3, the controller 126 receives input signals from a motor output speed sensor 128, a power take off sensor 130, and a line pressure sensor 132. The motor output speed sensor 128 may be a pulse pickup that senses the rate of rotation of the output shaft 114 of the motor 104, and provides a signal to the controller 126 indicating that rotation rate. The motor speed sensor 128 is an indirect sensor for the rate or rotation of the auger 106. The power takeoff sensor 130 may also be a pulse pickup sensor that senses the rate of rotation of the power takeoff shaft 124 and provides a signal to the controller 126 that indicates that rotation rate. The line pressure sensor 132 is a pressure sensor that senses the pressure within the hydraulic line connecting the pump 116 with the motor 104 and provides a signal to the controller indicating that pressure level. The line pressure sensor 132 may be located at a variety of locations within the hydraulic circuit as will be known to those of skill in the art.

The controller 126 also includes output lines to provide control signals to the pump 116 and the motor 104. Output signal line 134 permits the controller 126 to provide a control signal to the pump 116. The control signal may adjust the rate at which the pump 116 provides hydraulic fluid to the motor 104. Additionally, the output signal line 134 permits the controller to provide a signal that controls the direction of flow out of the pump 116, such that the pump 116 can rotate the motor 104 in either a forward or reverse direction about the axis 107. The output signal line 136 permits the controller 126 to provide a control signal to motor 104 in order to shift the motor 104 between the low speed maximum displacement setting and the high speed minimum displacement setting.

The controller 126 should be in connection with a user interface (not shown) that permits a user to provide input to and receive feedback from the controller 126. The controller 126 should be programmed with logic that causes the hydraulic drive system 101 to operate as desired based on control settings provided by a user through the user interface and on the feedback received from the various components by the controller 126 during operation.

According to one feature of the present invention, the hydraulic drive system 101 will drive the auger 106 at an appropriate speed to allow full usage of available horse power to efficiently mix the mixture 112 without stalling. According to this feature, a user will enter a setting of a mixing mode into the user interface (not shown). The controller 126 may be programmed with a minimum power takeoff speed, for example, 2000 rpm. If the PTO sensor 130 senses that the power takeoff shaft 124 is not rotating at or above the minimum setting, the controller 126 will provide an output to the user interface indicating that the power takeoff shaft is not rotating at a sufficient speed, and the system will not attempt to shift into a mixing mode. If the power takeoff shaft 124 is rotating at a sufficient speed above the programmed minimum, the controller 126 will send appropriate signals to cause the auger 106 to rotate at a preset maximum displacement mixing rotation speed. For example, during mixing while the motor is in the maximum displacement setting it may be desirable to have the auger 106 rotate at about 23 rpm. When in the mixing mode, the controller 126 first controls the pump 116 and motor 104 to maintain the rotation of the auger 106 at the predefined maximum displacement mixing rotation speed (e.g., 23 rpm). The controller 126 will adjust the output of the pump 116 in order to maintain the speed of rotation of the auger 106 at the desired setting. The controller 126 will also monitor the hydraulic pressure at the motor 104 by way of receiving a signal from the line pressure sensor 132.

At the start of a mix mode cycle, the motor 104 will be set at maximum displacement. If the motor hydraulic pressure drops below a specified minimum for a set period of time, the controller 126 will shift the motor 104 to the minimum displacement setting. For example, if the line pressure at the motor 104 drops below 2000 psi for more than five seconds, the controller 126 will cause the motor 104 to shift to the minimum displacement setting. This increases the efficiency of the operation of the system by operating in the minimum displacement mode when feasible. The controller 126 then seeks to maintain the auger 106 at a minimum displacement mixing rotation rate that is higher than the rotation rate associated with the maximum displacement setting. Typically the minimum displacement mixing rotation rate will be set at about 35 rpm. If, after shifting to the minimum displacement setting, the hydraulic pressure at the motor 104 rises above a specified maximum for a set period of time, the controller 126 will cause the motor 104 to shift back to the maximum displacement setting. This prevents the auger 106 from stalling. For example, if the hydraulic pressure sensed by the line pressure sensor 132 is above 4000 psi for more than five seconds, the controller 126 will shift the motor 104 back to the maximum displacement setting, and again seek to maintain the rotation of the auger at the slower maximum displacement mixing rotation rate of 23 rpm. In this fashion, the hydraulic drive system 101 automatically adjusts the motor 104 to operate at an efficient setting and speed.

Occasionally during a mixing operation, the auger 106 may become jammed by mixture material 112 being wedged between the auger 106 and the bottom or side walls of the tub 102. According to one feature of the present invention, the hydraulic drive system 101 will recognize the jammed condition and attempt to automatically resolve it. If the auger 106 becomes jammed, the pressure at sensor 132 will be at a maximum line pressure, for example equal to a relief valve setting. Furthermore, the motor output speed sensor 128 will be sending a signal to the controller 126 that the rotation rate is at or near zero. If both of these conditions persist over a set period of time, the controller 126 will shift to a jam-resolving mode. In the jam-resolving mode, the controller 126 causes the pump 116 to operate in a reverse direction such that the motor 104 rotates in a reverse orientation, consequently causing the auger 106 to be rotated in a reverse direction. The auger 106 is rotated in a reverse direction for a short period of time in order to relieve the pressure and reposition the content of the feed mixture 112 that caused the jam. After rotating in a reverse direction for a short period of time, the auger 106 is again rotated in the forward direction, which should hopefully now be able to proceed freely without being jammed. The controller 126 may attempt to free the jam by performing the reverse rotation function a few times, if the initial operation of the reverse function is not sufficient to clear the jam.

For example, if the sensor 128 senses that the motor output shaft 114 is not rotating, and the pressure sensor 132 senses that the hydraulic pressure in the line is a above a specified minimum pressure, and these two conditions persist for a period of time, for example 12 seconds, the controller 126 will shift into the jam-resolving mode and will cause the auger 106 to rotate in reverse orientation for a set period of time, for example five seconds. The controller 126 will then cause the pump to again flow in the forward direction to cause forward rotation of the auger 106. If the auger 106 again is jammed, as indicated by a maximum pressure at the pressure sensor 132 and lack of rotation at the sensor 128, the controller 126 will again try the reversing operation. If three of the reversing operations in a row are not sufficient to free the jam, then a fault condition is indicated, and a user will be required to turn off the power and manually resolve the jam.

According to another feature of the present invention, the hydraulic drive system 101 may be shifted into a discharge mode by a user through the user interface. In the discharge mode, the auger speed is preferably maintained at a constant rate that is relatively slow as compared to the standard mixing speed. The power input required to maintain the auger 106 at a desired discharge rotation rate may vary significantly depending upon the amount of feed mixture 112 remaining in the tub 102. Therefore, as a general rule the amount of force required to rotate the auger 106 will decrease as the feed mixture 112 is depleted from the tub 102. When the hydraulic drive system 101 is shifted into the discharge mode, the controller 126 will control the output of the pump 116 to attempt to maintain the auger 106 at a rotation rate of about 18 rpm. In order to maintain the auger 106 at a relatively constant rotation rate, the controller 126 will maintain the motor 104 in the maximum displacement setting at all times when the system is in the discharge mode. Therefore, even if the pressure within line 132 drops to a low level, the motor 104 will not shift to the minimum displacement setting, and will remain at the maximum displacement setting. This avoids a temporary jump in rotation speed of the auger 106 that would occur if the motor 104 shifted to the more efficient minimum displacement setting.

According to another feature of the present invention, the hydraulic drive system 101 may be shifted into a clean-out mode at the end of a discharge mode in order to fully discharge the feed mixture 112 and clean off the auger 106. Therefore, if during the discharge mode the pressure sensor 128 senses that the pressure has dropped below a specified minimum for a set period of time, a user will be able to shift into the discharge mode using the user interface to provide a signal to the controller 126. In the discharge mode, the controller 126 shifts the motor 104 to the minimum displacement setting and attempts to maintain the auger 106 at a maximum rotation speed. For example, if during the discharge mode the pressure at sensor 128 remains below 2500 psi during a 3-second interval, the user may shift to the clean-out mode. When that happens, the controller 126 will shift the motor 104 to the minimum displacement setting, and will control the output of the pump 116 to rotate the auger 106 at a rate of about 48 rpm.

Figure 4:
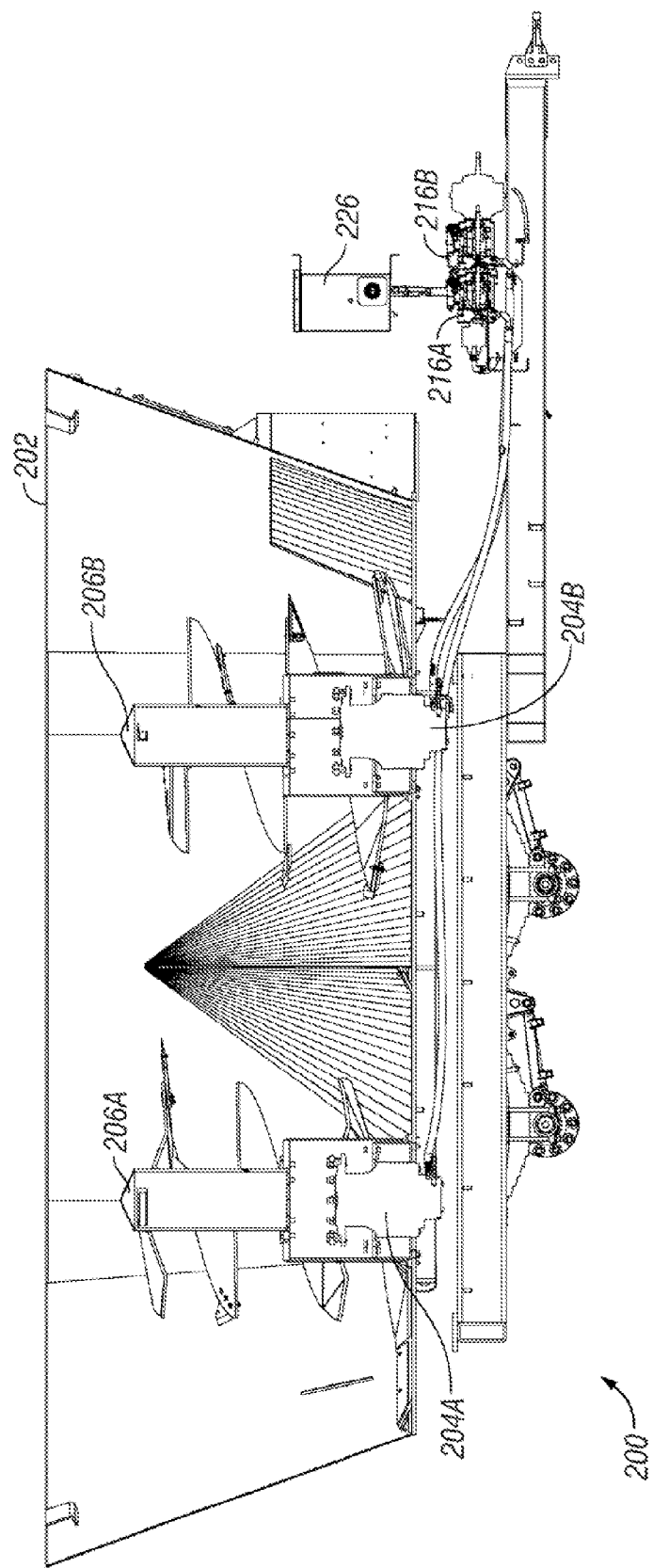
FIG. 4 is a cross-section side elevation view of a mixer with two augers according to one embodiment of the present invention.
Figure 5:
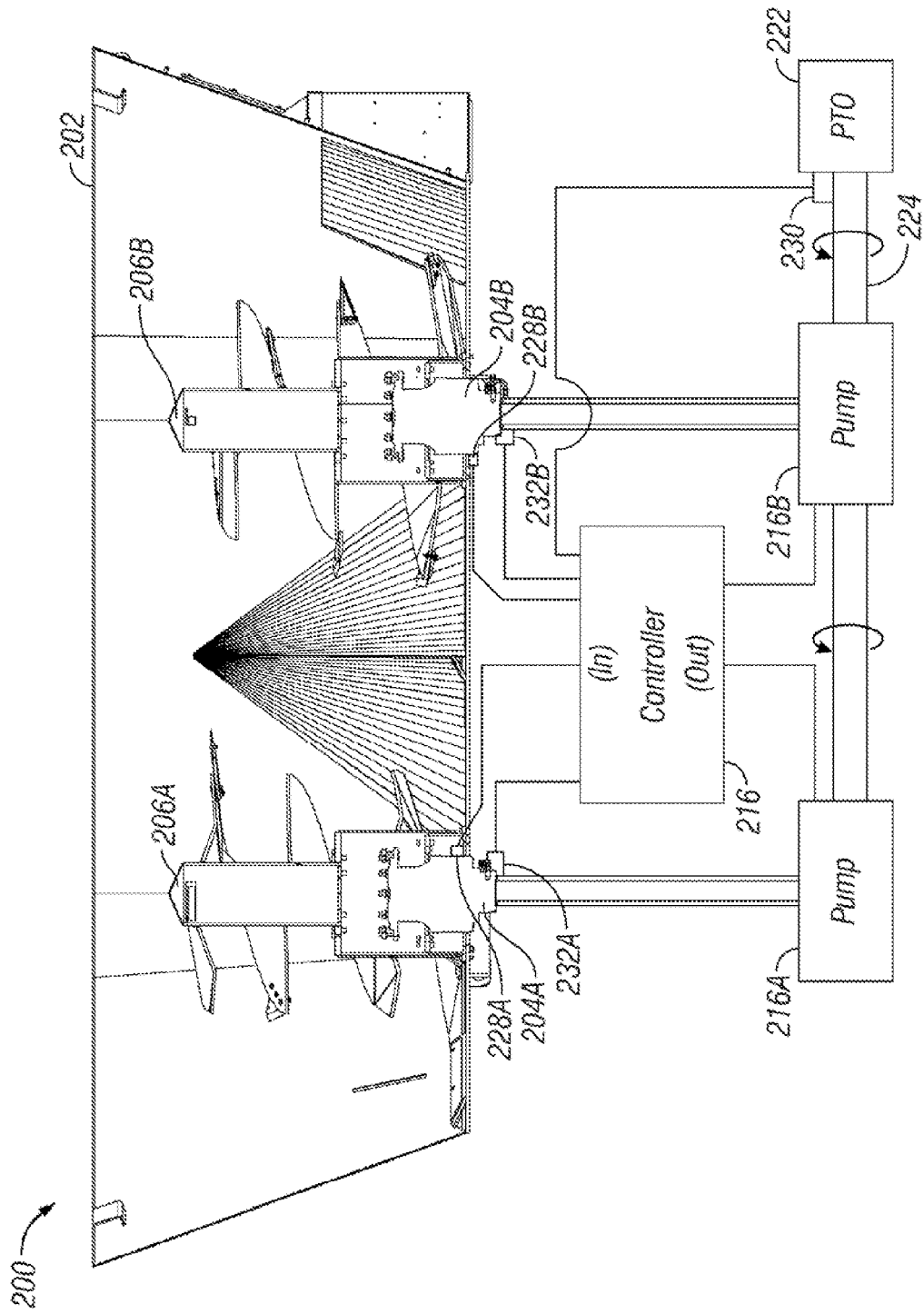
FIG. 5 is a schematic diagram illustrating the hydraulic drive system of the mixer of FIG. 4.

FIGS. 4 and 5 illustrate a mixer 200 according to another embodiment of the present invention. Mixer 200 is similar to mixer 100 that has previously described with respect to FIG. 3, except that mixer 200 includes two augers 206A&B. The operation and construction of mixer 200 should be apparent to those skilled in the art in light of the above detailed discussion related to mixer 100 shown in FIG. 3. Each of the augers 206A and 206B are provided with their own corresponding hydraulic motor 204A and B. Each of the hydraulic motors 204A and B are hydraulically connected with corresponding pumps 216A and B. Both of the pumps 216A and B are powered by a single power source 222, such as a power takeoff. The programmable controller 226 receives input signals from motor speed sensors 228A and B. The controller 226 also receives pressure input signals from line pressure sensors 232A and B. The controller 226 also receives an input signal from power takeoff sensor 230 that indicates to the controller 226 at what speed the power takeoff shaft 224 is rotating.

The operation of the hydraulic control system 201 of the mixer 200 is similar to that of hydraulic drive system 101 with respect to mixer 100 shown in FIG. 3. A user may select whether to control the augers 206A and B in tandem or individually. If the augers 206A and 206B are operated in tandem, a single mode is selected for operation of both of the augers 206A and 206B. For example, both the augers 206A and 206B may be controller according to the parameters of the mixing mode. In the tandem control setting, the jam mode will only be entered if both of the augers 206A and 206B satisfy the jam conditions of having a maximum pressure at sensors 232A and B and a no-rotation condition sensed by motor sensors 228A and B. Similarly, the system will only shift into the cleanout mode when the line pressure is sensed to be below the specified minimum for a set period of time for both augers 206A and 206B.

According to another feature of the present invention, the augers 206A and 206B may be operated independently. A primary usage for this feature would be to maintain one of the augers, for example 206A in a stationary condition, while discharging the feed in proximity to auger 206B.

A preferred embodiment of the present invention has been set forth above and in the drawings. It should be understood by one of ordinary skill in the art that modifications may be made in many of the details discussed above, especially in matters of shape, size, and arrangement of parts. For example, while embodiments showing both one and two-auger mixers have been shown and described, the present invention should not be limited to such embodiments. Mixers employing three or more augers may also beneficially use the present invention. Such modifications are deemed to be within the scope of the present invention, which is to be limited only by the broad general meaning of the terms in which the appended claims are expressed.

What is claimed is:

1. An agricultural feed mixer comprising:
   a tub;
   an auger extending into the tub, the auger being rotatable about an axis;
   a drive mechanism operably connected to the auger to rotate the auger about the axis, the drive mechanism including a variable displacement hydraulic motor;
   a jam detection mechanism that detects when the auger is jammed such that the auger will not rotate freely in a first direction around the axis, the jam detection mechanism comprising a pressure sensor that senses a pressure of hydraulic fluid that drives the variable displacement hydraulic motor and provides a pressure signal to the controller indicating the sensed pressure of the hydraulic fluid that drives the variable displacement hydraulic motor; and
   a controller to cause the drive mechanism to rotate the auger in a second direction around the axis when the jam detection mechanism detects that the auger is jammed.

2. The agricultural mixer of claim 1, wherein the jam detection mechanism further includes a rotation sensor that senses whether the auger is rotating.

3. The agricultural mixer of claim 2, wherein the rotation sensor is adapted to sense a rate of rotation associated with the auger and provide a signal indicating the sensed rate of rotation to the controller, the variable displacement hydraulic motor has a maximum displacement setting and a minimum displacement setting, and wherein the controller is programmed to operate the mixer in a mixing mode such that the variable displacement motor shifts from the maximum displacement setting to the minimum displacement setting if the sensed pressure is below a minimum pressure and the variable displacement motor shifts from the minimum displacement setting back to the maximum displacement setting when the sensed pressure is above a maximum pressure.

4. The agricultural mixer of claim 1, wherein the variable displacement hydraulic motor has a maximum displacement setting and a minimum displacement setting, and wherein the controller is programmed to operate the drive mechanism in a mixing mode wherein the controller causes the hydraulic motor to operate at an efficient setting.

5. The agricultural mixer of claim 4, wherein the controller is programmed to operate the drive mechanism in a discharge mode wherein the auger is rotated at a relatively constant rate of rotation and wherein the hydraulic motor is operated at the maximum displacement setting without shifting to the minimum displacement setting.

6. The agricultural mixer of claim 5, wherein controller is programmed to operate the drive mechanism in a clean out mode wherein the auger is rotated at relatively constant higher rate of rotation than in the mixing mode and discharge mode, and wherein the hydraulic motor is operated at the minimum displacement setting without shifting into the maximum displacement setting.

7. The agricultural mixer of claim 1, further comprising a second auger extending into the tub.

8. The agricultural mixer of claim 7, wherein the controller is adapted to control the auger and the second auger in tandem with each other.

9. The agricultural mixer of claim 7, wherein the controller is adapted to control the auger and the second auger independently from each other.

10. An agricultural mixer comprising:
a tub;
an auger extending into the tub, the auger being rotatable in a first direction about a vertical axis to mix material within the tub;
a hydraulic motor operably connected to the auger to rotate the auger about the vertical axis;
a hydraulic pump operably connected to the hydraulic motor to supply pressurized hydraulic fluid to the hydraulic motor, the pressurized hydraulic fluid providing a driving force for the hydraulic motor;
a controller that controls the pump and motor;
a pressure sensor that senses a pressure of the hydraulic fluid and provides a pressure signal to the controller;
a rotation sensor that senses a rotation speed associated with the auger and provides a rotation speed signal to the controller; and
wherein the controller has a jam resolving mode such that when the controller receives a pressure signal above a maximum threshold and a rotation speed signal indicating that the auger is not rotating, the controller causes the auger to rotate in a reverse direction opposite from the first direction for a period of time.

11. The agricultural mixer of claim 10, wherein the controller has a mixing mode wherein the controller adjusts the hydraulic motor into an efficient setting based upon the sensed pressure of the hydraulic fluid.

12. The agricultural mixer of claim 11, wherein the hydraulic motor is a variable displacement hydraulic motor having a maximum displacement setting and a minimum displacement setting, and wherein when the controller is in the mixing mode the variable displacement motor shifts from the maximum displacement setting to the minimum displacement setting if the sensed pressure is below a minimum pressure for a first time period and the variable displacement motor shifts from the minimum displacement setting back to the maximum displacement setting when the sensed pressure is above a maximum pressure for a second time period.

13. The agricultural mixer of claim 10, wherein the controller has a discharge mode wherein the controller maintains a constant rotation rate for the auger.

14. The agricultural mixer of claim 13, wherein the hydraulic motor is a variable displacement hydraulic motor having a maximum displacement setting and a minimum displacement setting, and wherein when the controller is in the discharge mode the hydraulic motor is operated at the maximum displacement setting without shifting to the minimum displacement setting.

15. The agricultural mixer of claim 13, wherein the controller has a cleanout mode wherein the controller maintains a rotation rate faster than the constant rotation rate of the discharge mode, and further wherein the cleanout mode can only be entered when the controller has been in the discharge mode for a predetermined length of time.

16. The agricultural mixer of claim 15, wherein the hydraulic motor is a variable displacement hydraulic motor having a maximum displacement setting and a minimum displacement setting, and wherein when the controller is in the cleanout mode the hydraulic motor is operated at the minimum displacement setting without shifting to the maximum displacement setting.

17. A method of operating an agricultural feed mixer of the type having a generally vertical auger in a tub, the method comprising:
detecting that the auger is jammed such that it is not rotating in a forward mixing direction based upon a sensed pressure in hydraulic fluid used to drive a hydraulic drive system operably connected to the auger;
rotating the auger in a reverse direction after detecting that it is jammed; and
rotating the auger in the forward mixing direction after rotating it in the reverse direction.

18. The method of claim 17, wherein the detecting step comprises sensing a rate of rotation associated with the auger.

19. A method of efficiently operating an agricultural feed mixer of the type having a generally vertical auger in a tub wherein the vertical auger is operably attached to a variable displacement hydraulic motor having a maximum displacement setting and a minimum displacement setting such that the hydraulic motor will rotate the vertical auger within the tub, the method comprising:
rotating the auger in a forward mixing direction using the hydraulic motor at the maximum displacement setting;
periodically sensing a pressure of hydraulic fluid in communication with the hydraulic motor while the auger is rotating with the hydraulic motor at the maximum displacement setting;
shifting the hydraulic motor to the minimum displacement setting if the sensed pressure of the hydraulic fluid is below a minimum pressure for a first predetermined period of time;
periodically sensing the pressure of hydraulic fluid in communication with the hydraulic motor while the auger is rotating with the hydraulic motor at the minimum displacement setting; and
shifting the hydraulic motor back to the maximum displacement setting if the sensed pressure of the hydraulic fluid is above a maximum pressure for a second predetermined period of time.

20. The method of claim 19, further comprising:
after completing the steps of claim 19, discharging feed from the tub at a substantially constant rate by rotating the auger at a constant rotation rate with the hydraulic motor at the maximum displacement setting without shifting to the minimum displacement setting.

21. The method of claim 20, further comprising:
after completing the steps of claim 20, cleaning out the tub by rotating the auger at a faster rate than the constant rotation rate use to discharge the feed with the hydraulic motor at the minimum displacement setting without shifting to the maximum displacement setting.

22. The method of claim 19, further comprising:
detecting that the auger is jammed such that it is not rotating in a forward mixing direction;
rotating the auger in a reverse direction after detecting that it is jammed; and
rotating the auger in the forward mixing direction after rotating it in the reverse direction.

* * * * *